United States Patent
Seto et al.

[11] Patent Number: 5,882,803
[45] Date of Patent: Mar. 16, 1999

[54] HIGH-STRENGTH HOT DIP GALVANNEALED STEEL SHEETS HAVING EXCELLENT PLATING PROPERTIES AND METHOD OF PRODUCING THE SAME

[75] Inventors: Kazuhiro Seto; Kei Sakata; Toshiyuki Kato; Shigeru Umino; Chiaki Kato, all of Chiba, Japan

[73] Assignee: Kawasaki Steel Corporation, Japan

[21] Appl. No.: 525,686

[22] PCT Filed: Feb. 13, 1995

[86] PCT No.: PCT/JP95/00196

§ 371 Date: Sep. 28, 1995

§ 102(e) Date: Sep. 28, 1995

[87] PCT Pub. No.: WO95/21947

PCT Pub. Date: Aug. 17, 1995

[30] Foreign Application Priority Data

Feb. 15, 1994 [JP] Japan ..................... 6-018364

[51] Int. Cl.$^6$ ............... B32B 15/18; C22C 38/00; C21D 1/00
[52] U.S. Cl. ............... 428/659; 428/681; 427/433; 148/320; 148/625
[58] Field of Search .................. 428/659, 650, 428/681; 148/625, 660, 320, 330; 427/433

[56] References Cited

U.S. PATENT DOCUMENTS

| | | | |
|---|---|---|---|
| 4,708,748 | 11/1987 | Satoh et al. | 148/2 |
| 5,019,460 | 5/1991 | Yasuda et al. | 428/659 |
| 5,049,453 | 9/1991 | Suemitsu et al. | 428/629 |
| 5,156,690 | 10/1992 | Asano et al. | 428/659 |
| 5,360,493 | 11/1994 | Matsuoke et al. | 148/320 |
| 5,433,796 | 7/1995 | Isobe et al. | 148/220 |
| 5,447,802 | 9/1995 | Tobiyama et al. | 428/610 |
| 5,486,241 | 1/1996 | Ushioda et al. | 148/330 |

FOREIGN PATENT DOCUMENTS

| | | |
|---|---|---|
| 63-100158 | 5/1988 | Japan . |
| A-3-294463 | 12/1991 | Japan . |
| 4-154937 | 5/1992 | Japan . |
| 5-255807 | 10/1993 | Japan . |
| A-6-025798 | 2/1994 | Japan . |

OTHER PUBLICATIONS

Translation of JP 06–025798 (Feb. 1994).
Translation of JP 03–294463 (Dec. 1991).

*Primary Examiner*—John J. Zimmerman
*Assistant Examiner*—Michael LaVilla
*Attorney, Agent, or Firm*—Austin R. Miller

[57] ABSTRACT

The invention is a high-strength hot dip galvannealed steel sheet having excellent press formability and plating properties by utilizing Si as a strengthening component, specifying an interrelation between Si and Mn and further specifying an alloying ratio of hot dip galvannealed layer, which comprises C: 0.0005–0.0050%, Si: 0.1–2.5%, Mn: 0.1–2.5%, Ti: 0.003–010%, Nb: 0.003–0.10%, B: 0.005–0.0080%, P: 0.040–0.18%, S: not more than 0.008%, Al: 0.005–0.10%, and N: not more than 0.0060 wt %, provided that Si and Mn satisfy the following equation, and the remainder being Fe and incidental impurities, and has a hot dip galvannealed layer formed on a surface of the steel sheet and having a Fe content of 9–12%, wherein said equation is:

$$1.5 \, (\% \, Mn) - 2 \leq (\% \, Si) \leq 2(\% \, Mn) \quad (1).$$

9 Claims, No Drawings

HIGH-STRENGTH HOT DIP GALVANNEALED STEEL SHEETS HAVING EXCELLENT PLATING PROPERTIES AND METHOD OF PRODUCING THE SAME

This application is the National Stage of International Application No. PCT/JP95/00196, filed on 13, Feb. 1995.

1. Technical Field

This invention relates to high-strength hot dip galvannealed steel sheets mainly usable in bending, press forming, deep drawing or the like for vehicle bodies, and to a method of producing the same.

2. Background Art

Recently, it has been strongly demanded to reduce the weight of a vehicle body in order to improve fuel consumption from a viewpoint of regulations for automobile emission gas and the like based on environmental pollution. And also, improvement of safety in automobiles is an important matter. As a counter-measure to these problems, it is required to develop high-strength hot dip galvannealed steel sheets having a tensile strength of not less than about 400 MPa and excellent press formability.

In cold rolled steel sheets, however, the press formability or average r-value and balance between strength and ductility (hereinafter referred to as TS-El) are generally degraded as the strength increases, and also it tends to deteriorate surface properties such as plating properties and the like. Therefore, in order to use this steel sheet for an automobile, it is important to improve plating properties and press formability in addition to increase of strength.

Up to the present, there have been proposed various methods for improving press formability accompanied with increase of strength.

For example, JP-A-63-100158 discloses a high-strength cold rolled steel sheet having excellent formability in which an extreme-low carbon steel having a reduced amount of C is combined with Ti, Nb and the like as a carbonitride forming component to improve workability and aging and further contains amounts of Si, Mn, P not damaging workability to mainly increase strength. Particularly, Si is a component useful for increasing strength without degrading workability represented by average r-value, elongation and the like. However, when a great amount of Si is included, deterioration of surface properties can not be avoided and a problem of considerably degrading plating properties arises.

Therefore, in order to increase the strength of the hot dip galvannealed steel sheet, as disclosed in JP-A-5-255807 (high-strength cold rolled steel sheets having excellent formability and high-strength hot dip galvannealed cold rolled steel sheets as well as a method of producing the same), restricting Si to not more than 0.03% and mainly using P and Mn as a strengthening components is prevalent. However, when a great amount of P is added, the problem arises that galvannealed alloying is delayed and particularly, that secondary working embrittlement is apt to be caused in the extreme-low carbon steel. And also, Mn has less influence upon plating properties, but an Mn content of not less than 1% starts deterioration of the plating properties when restricting Si to not more than 0.1%, and when Mn is included in a great amount, another problem arises that the transformation point is lowered to cause inconvenience in bringing about the deterioration of material that the hot rolled sheet is hardened and is not recrystallized during annealing.

Thus, there is a limit in increasing strength only by the addition of P and Mn while maintaining good workability and plating properties.

DISCLOSURE OF INVENTION

The inventors have made various studies and found that high-strength hot dip galvannealed steel sheets possessing good plating properties and press formability and having a tensile strength of not less than 400 MPa are obtained by utilizing Si as a strengthening component and specifying an interrelation between Si and Mn.

That is, the essential point of the invention is as follows:

A high-strength hot dip galvannealed steel sheet having excellent plating properties comprising a steel sheet wherein all percentages are expressed by mass or weight, having a composition consisting essentially of C: not less than 0.0005% but not more than 0.0050%,
Si: not less than 0.1% but not more than 2.5%,
Mn: not less than 0.1% but not more than 2.5%,
Ti: not less than 0.003% but not more than 0.10%,
Nb: not less than 0.003% but not more than 0.10%,
B: not less than 0.0005% but not more than 0.0080%,
P: not less than 0.040% but not more than 0.18%,
S: not more than 0.008%,
Al: not less than 0.005% but not more than 0.10%, and
N: not more than 0.0060%, provided that Si and Mn satisfy the relation of the following equation (1), and the remainder being Fe and incidental impurities, and a hot dip galvannealed layer formed on a surface of the sheet and having a Fe content of 9–12%, said equation (1) being as follows:

$$1.5(\% \text{ Mn})-2 \leq (\% \text{ Si}) \leq 2(\% \text{ Mn}) \qquad (1)$$

As preferred forms, wherein the C content is not less than 0.0005% but not more than 0.004%, the Si content is not less than 0.2% but not more than 2.5%, the Mn content is not less than 0.2% but not more than 2.5%, the B content is not less than 0.0005% but not more than 0.0050%, the P content is not less than 0.04% but not more than 0.15%, the S content is not more than 0.010%, the Al content is not less than 0.005% but not more than 0.06%, having excellent plating properties according to the N content is not more than 0.0040%.

A method of producing a high-strength hot dip galvannealed steel sheet having excellent plating properties, is characterized in that a slab of steel having a composition of C: not less than 0.0005% but not more than 0.0050%,
Si: not less than 0.1% but not more than 2.5%,
Mn: not less than 0.1% but not more than 2.5%,
Ti: not less than 0.003% but not more than 0.10%,
Nb: not less than 0.003% but not more than 0.10%,
B: not less than 0.0005% but not more than 0.0080%,
P: not less than 0.040% but not more than 0.18%,
S: not more than 0.008%,
Al: not less than 0.005% but not more than 0.10%, and
N: not more than 0.0060%, provided that Si and Mn satisfy the following equation (1), and the remainder being Fe and incidental impurities, is used as a starting material, hot rolled and subjected to finish rolling within a temperature range of not lower than 750° C. but not higher than 1000° C., pickled and subjected to cold rolling at a draft of not less than 60% but not more than 95%, and the resulting cold rolled sheet is passed through a continuously hot dip galvannealing installation wherein it is recrystallized within a temperature range of not lower than 700° C. but not higher than 950° C., quenched to a temperature region of 380°–530° C., immersed in a hot dip galvannealing bath of 450°–490° C. containing 0.12–0.145 mass % of Al in a temperature region of not lower than the bath temperature but not higher than the Bath temperature +10° C. and alloyed by heating within a temperature range of 450°–550° C. for not less than 14 seconds but not more than 28 seconds, wherein.

$$1.5(\% \text{ Mn})-2 \leq (\% \text{ Si}) \leq 2(\% \text{ Mn}) \quad (1)$$

There will be described experimental results based on the invention below.

The relation among Si and Mn contents and plating properties was examined with respect to cold rolled steel sheets 0.75 mm in thickness containing C: 0.002%, Ti: 0.04%, Nb: 0.03%, B: 0.002%, P: 0.10%, S: 0.006%, Al: 0.04% and N: 0.002% and having different Si and Mn contents.

Moreover, these steel sheets were are produced by hot rolling a sheet bar having the above composition at a finish rolling temperature of 820°–910° C., pickling, cold rolling at a draft of 75–85% and passing through a hot dip galvannealing line and annealed within a temperature range of 780°–890° C., quenched to a temperature region of 450°–500° C., immersed in a hot dip galvannealing bath containing 0.13% of Al and alloyed within a temperature range of 450°–550° C. (Fe content in plated layer: about 10%). Further, the plating properties were evaluated by visual judgment of appearance (non-plated portion) and judgment of resistance to powdering through a 90° bending test.

As to these steel sheets, the results on the relation among Si and Mn contents and plating properties are shown in Table 1.

TABLE 1

| Symbol of steel | Chemical component | | 1.5 | | Tensile strength | Plating properties | |
|---|---|---|---|---|---|---|---|
| | Mn | Si | (% Mn)-2 | 2 (% Mn) | (MPa) | non-plated portion | resistance to powdering |
| A | 0.5 | 0.6 | −1.25 | 1.0 | 401 | ⊚ | ⊚ |
| B | 0.5 | 0.9 | −1.25 | 1.0 | 412 | ⊚ | ⊚ |
| C | 0.5 | 1.2 | −1.25 | 1.0 | 430 | ○ | x |
| D | 1.5 | 0.2 | 0.25 | 3.0 | 408 | ○ | x |
| E | 1.5 | 1.0 | 0.25 | 3.0 | 447 | ⊚ | ⊚ |
| F | 1.5 | 1.5 | 0.25 | 3.0 | 477 | ⊚ | ⊚ |
| G | 2.0 | 0.5 | 1.00 | 4.0 | 436 | x | x |
| H | 2.0 | 1.5 | 1.00 | 4.0 | 497 | ⊚ | ⊚ |

⊚: not occurred
○: slightly occurred
x: occurred
⊚: acceptable
x: unacceptable

As seen from the results of Table 1, when the interrelation between Si and Mn is within the range of the relationship $1.5(\% \text{ Mn})-2 \leq (\% \text{ Si}) \leq 2(\% \text{ Mn})$, the appearance and resistance to powdering are good. When at least either of Si and Mn is greater outside the above range, the plating properties are degraded. Although the reason for this is not clear, it is considered that an oxide film formed on the surface of the steel sheet is $SiO_2$ in case of adding Si alone or MnO in case of adding Mn alone, and is poor in wettability by molten zinc, while when Si and Mn are included so as to satisfy the above relation, the resulting oxide film is mainly composed of $MnSiO_3$ and improves wettability by molten zinc.

The reason why each component in the invention is limited to the above composition range will be described below.

C: not less than 0.0005% but not more than 0.0050%

The C content is necessary to be not more than 0.0050% in order to provide steel sheets having good workability, particularly good TS-El balance. It is desirable that steel is an extreme-low carbon steel containing preferably not more than 0.0040%, more particularly not more than 0.0030%. However, when a great amount of P is included together, if C is less than 0.0005%, the resistance to secondary working embrittlement degrades. Therefore, the C content is restricted to not less than 0.0005% but not more than 0.0050%, preferably not less than 0.0005% but not more than 0.0040%, more particularly not less than 0.0005% but not more than 0.0030%.

Si: not less than 0.1% but not more than 2.5%

Si serves to reduce the deterioration of workability, and to strengthen the steel, and its amount is required to be not less than 0.1%. However, when the content exceeds 2.5 mass %, the deterioration of the resistance to secondary working embrittlement is caused. Therefore, the Si content is restricted to not less than 0.1 mass % but not more than 2.5 mass %. From the main point of the invention utilizing Si to strengthen the steel while holding the workability, if it is intended to provide the tensile strength of not less than 400 MPa grade, the Si content is preferably not less than 0.2 mass % but not more than 2.5 mass %, more particularly not less than 0.3 mass % but not more than 2.5 mass %. Mn: not less than 0.1 mass % but not more than 2.5 mass %

The Mn content is desirable to be decreased from a viewpoint of the workability and resistance to secondary working embrittlement, but when it is less than 0.1 mass %, sufficient strengthening effect as a material for automobiles is not obtained. Furthermore, when a great amount of Si raising the transformation point in the hot rolling is included, it is difficult to conduct normal hot rolling in an austenite zone, so that it is desired that the transformation point is adjusted to an adequate temperature region by adding Mn decreasing the transformation point in an amount of not less than 0.2 mass %, more preferably not less than 0.4 mass %. On the other hand, when the content exceeds 2.5 mass %, it is difficult to improve the resistance to secondary working embrittlement and also it is difficult to conduct the cold rolling because the steel is considerably hardened. Therefore, the Mn content is restricted to not less than 0.1 mass % but not more than 2.5 mass %, preferably not less than 0.2 mass % but not more than 2.5 mass %, more particularly not less than 0.4 mass % but not more than 2.5 mass %.

Ti: not less than 0.003 mass % but not more than 0.10 mass %

Nb: not less than 0.003 mass % but not more than 0.10 mass %

Ti fixes a part or full of N, C, S, and Nb fixes a part or full of C, so that they are effective to ensure the workability and non-aging property of the extreme-low carbon steel. However, when each content is less than 0.003 mass %, the effect is not obtained, so that this value is a lower limit. On the other hand, when it exceeds 0.1 mass %, the workability is inversely degraded, so that this value is an upper limit. Moreover, when the C content is decreased to not more than about 0.0020 mass % from a viewpoint of further improvement of the workability, the total content of Ti and Nb is preferably not less than 0.03 mass % but not more than 0.10 mass %, more particularly not less than 0.03 mass % but not more than 0.08 mass %.

B: not less than 0.0005 mass % but not more than 0.0080 mass %

B exhibits a remarkable effect of preventing the secondary working embrittlement by segregation into grain boundary. When the content is less than 0.0005 mass %, the effect is less, while when it exceeds 0.0080 mass %, the effect is saturated and the rise of yield strength and decrease of elongation are caused to degrade the workability. Therefore, the content is restricted to not less than 0.0005 mass % but not more than 0.0080 mass %. Since the workability is slightly degraded by the addition of B, except for the case that P of more than 0.15 mass % is included, it is preferably not less than 0.0005 mass % but not more than 0.0050 mass %, more particularly not less than 0.0005 mass % but not more than 0.0030 mass %.

P: not less than 0.040 mass % but not more than 0.18 mass %

P has an effect of not only strengthening the steel but also improving the workability, particularly average r-value, and is included in accordance with the given strength. The effect becomes remarkable when the content is not less than 0.040 mass %, while when it exceeds 0.18 mass %, the alloying of the plating layer is considerably delayed and also the material is degraded by solidification segregation in the casting. Furthermore, when the C content is decreased for improving the material, the deterioration of the resistance to secondary working embrittlement is started when the content is not less than 0.12 mass %, so that it is required to add a great amount of B at the P content of not less than 0.15 mass %.

Therefore, the P content is limited to not less than 0.040 mass % but not more than 0.18 mass %, preferably not less than 0.040 mass % but not more than 0.15 mass %, more particularly not less than 0.040 mass % but not more than 0.12 mass %.

S: not more than 0.015 mass %

When the S content exceeds 0.015 mass %, a great amount of MnS is precipitated to degrade the workability, so that this is an upper limit. Moreover, it is preferably not more than 0.010 mass %, more particularly not more than 0.008 mass % from a viewpoint of further improvement of the workability. The content is desired to be made small, but when it is less than 0.0005 mass %, the production cost considerably rises by the existing technique and it si impractical.

Al: not less than 0.005 mass % but not more than 0.10 mass %

Al is added for deoxidation and precipitation and fixation of N in steel, if necessary. When the content is less than 0.005 mass %, inclusions increases and a good workability is not obtained. On the other hand, when the content is too large, not only the workability but also the surface properties are deteriorated, so that the Al content is restricted to not less than 0.005 mass % but not more than 0.10 mass %. It is preferably not less than 0.005 mass % but not more than 0.06 mass %, more particularly not less than 0.01 mass % but not more than 0.06 mass % from a viewpoint of the rationalization of the workability through the above mechanism.

N: not more than 0.0060 mass %

N is a harmful component mainly resulting in strain aging. When the content is too large, it is required to add great amounts of Ti and Al, so that the upper limit is 0.0060 mass %. From a viewpoint of further improvement of the workability, it is preferably not more than 0.0040 mass %, more particularly not more than 0.0030 mass %. Moreover, the content is desirable to become low, but when it is less than 0.0003 mass %, the production cost considerably rises according to the existing technique and it is impractical.

The reason on the limitations of process conditions will be described below.

The steel-making and casting conditions are sufficient as conducted according to the usual manner.

The finish temperature of hot rolling is required to be 750° C. at minimum in order to obtain good workability after the cold rolling and annealing. When the temperature is lower than the above value, the rolling structure considerably remains in the hot rolled sheet, which becomes disadvantageous in the formation of texture suitable for the press formability. On the other hand, when the rolling is completed above 1000° C., the coarsening of structure in the hot rolled sheet is caused and hence the texture suitable for the press formability is not obtained. Therefore, the finish temperature of hot rolling is not lower than 750° C. but not higher than 1000° C.

In the cold rolling, if the cold rolling draft is less than 60%, the sufficient workability is not obtained, so that it is restricted to not less than 60%. Preferably, the cold rolling draft of not less than 70% is advantageous. On the other hand, when the cold rolling draft exceeds 95%, the workability is degraded, so that the upper limit is 95%.

The plating is carried out in a continuous hot dip galvannealing installation. The recrystallization annealing temperature after the cold rolling is sufficient to be not lower than 700° C. but not higher than 950° C., but the annealing may desirably be carried out at a temperature of not lower than 800° C. After the annealing, it is quenched to a temperature region of 380°–530° C. When the quench stopping temperature is lower than 380° C., non-plated portion is created, while when it exceeds 530° C., unevenness is undesirably be caused on the plated surface. After the quenching, the plating is carried out by immersing in a hot dip galvannealing bath containing 0.12–0.145 mass % of Al. When the Al content in the bath is less than 0.12 mass %, the alloying is too promoted and the plating adhesion property (resistance to powdering) is degraded. On the other hand, when it exceeds 0.145 mass %, the non-plated portion is created. The alloying through heating followed to the plating is carried out so as to render the Fe content in the plated layer into 9–12%. That is, the alloying is carried out by heating within a tempera- ture range of 450°–550° C. for not less than 14 seconds but not more than 28 seconds. When the heating temperature is lower than 450° C. or the heating time is less than 14 seconds, the alloying is not sufficiently conducted and hence the Fe content is less than 9% to degrade the resistance to flaking. On the other hand, when the heating temperature exceeds 550° C. or the heating time exceeds 28 seconds, the alloying is excessively promoted and the resistance to powdering is degraded.

The temperature of the galvannealing bath is within a range of 450°–490° C., while the temperature of the sheet to be immersed in the bath is not lower than the bath temperature but not higher than (bath temperature +10° C.). When the bath temperature is lower than 450° C. or the temperature of the sheet is lower than the bath temperature, the solidification of zinc is promoted and it is difficult to adjust the plating amount. On the other hand, when the bath temperature exceeds 490° C. or the temperature of the sheet exceeds (bath temperature +10° C.), the elusion of iron from the steel sheet into the bath is promoted to form dross and the surface defect is apt to be caused.

Moreover, even if the steel sheet obtained according to the invention is subjected to a special treatment such as application of lubricant onto the surface or the like to further improve the press formability, weldability or corrosion resistance, the characteristics aiming at the invention are unchangeable. Furthermore, even if the steel sheet according to the invention (or steel sheet according to the invention subjected at its surface to the special treatment) is subjected to temper rolling for the shape correcting or the like, the characteristics aiming at the invention are unchangeable.

BEST MODE FOR CARRYING OUT THE INVENTION EXAMPLE

Slabs of steel prepared in a convertor and having a chemical component shown in Table 2 is used as a starting material and subjected to hot rolling, pickling and cold rolling to a sheet thickness of 0.8 mm, which is subjected to a plating in a continuous hot dip galvannealing line. The tensile properties and plating properties are measured with respect to the thus obtained steel sheets. Moreover, the plating bath temperature is within a range of 460°–480° C., and the temperature of sheet to be immersed is within a range of plating bath temperature to (plating bath temperature +10° C.), and the alloying condition is a heating within a temperature range of 480°–540° C. for 15–28 seconds.

TABLE 2

| Steel No. | Chemical components (mass %) | | | | | | | | | | 1.5 (mass % Mn) − 2 | 2 (mass % Mn) |
|---|---|---|---|---|---|---|---|---|---|---|---|---|
| | C | Si | Mn | Ti | Nb | B | P | S | Al | N | | |
| 1 | 0.0042 | 0.30 | 0.16 | 0.047 | 0.016 | 0.0025 | 0.112 | 0.006 | 0.045 | 0.0026 | −1.76 | 0.32 |
| 2 | 0.0040 | 0.35 | 0.42 | 0.062 | 0.018 | 0.0029 | 0.125 | 0.008 | 0.036 | 0.0031 | −1.37 | 0.84 |
| 3 | 0.0031 | 0.78 | 0.44 | 0.058 | 0.008 | 0.0028 | 0.087 | 0.006 | 0.032 | 0.0025 | −1.34 | 0.88 |
| 4 | 0.0031 | 0.78 | 0.44 | 0.058 | 0.005 | 0.0016 | 0.087 | 0.005 | 0.032 | 0.0026 | −1.34 | 0.88 |
| 5 | 0.0031 | 0.78 | 0.44 | 0.058 | 0.006 | 0.0034 | 0.087 | 0.010 | 0.032 | 0.0029 | −1.34 | 0.88 |
| 6 | 0.0031 | 0.78 | 0.44 | 0.058 | 0.014 | 0.0022 | 0.087 | 0.008 | 0.032 | 0.0032 | −1.34 | 0.88 |
| 7 | 0.0031 | 0.78 | 0.44 | 0.058 | 0.014 | 0.0024 | 0.087 | 0.005 | 0.032 | 0.0022 | −1.34 | 0.88 |
| 8 | 0.0008 | 0.52 | 1.01 | 0.014 | 0.021 | 0.0050 | 0.152 | 0.006 | 0.016 | 0.0020 | −0.49 | 2.02 |
| 9 | 0.0016 | 1.50 | 0.98 | 0.008 | 0.028 | 0.0032 | 0.065 | 0.005 | 0.025 | 0.0041 | −0.53 | 1.96 |
| 10 | 0.0020 | 1.86 | 1.14 | 0.030 | 0.018 | 0.0042 | 0.042 | 0.004 | 0.027 | 0.0035 | −0.29 | 2.28 |
| 11 | 0.0024 | 0.51 | 1.56 | 0.011 | 0.033 | 0.0012 | 0.082 | 0.007 | 0.042 | 0.0026 | 0.34 | 3.12 |
| 12 | 0.0025 | 1.55 | 1.65 | 0.005 | 0.052 | 0.0025 | 0.062 | 0.006 | 0.046 | 0.0027 | 0.48 | 3.30 |
| 13 | 0.0021 | 1.95 | 1.66 | 0.007 | 0.044 | 0.0021 | 0.052 | 0.006 | 0.045 | 0.0032 | 0.49 | 3.32 |
| 14 | 0.0040 | *0.52 | 0.18 | 0.042 | 0.026 | 0.0026 | 0.108 | 0.006 | 0.046 | 0.0040 | −1.73 | 0.36 |
| 15 | 0.0038 | *1.21 | 0.45 | 0.048 | 0.009 | 0.0027 | 0.062 | 0.008 | 0.050 | 0.0038 | −1.33 | 0.90 |
| 16 | 0.0026 | *2.25 | 1.02 | 0.035 | 0.008 | 0.0026 | 0.042 | 0.008 | 0.043 | 0.0026 | −0.47 | 2.04 |
| 17 | 0.0028 | *0.16 | 1.54 | 0.039 | 0.016 | 0.0028 | 0.143 | 0.006 | 0.055 | 0.0028 | 0.31 | 3.08 |
| 18 | 0.0026 | *0.89 | 2.10 | 0.037 | 0.011 | 0.0026 | 0.104 | 0.007 | 0.042 | 0.0026 | 1.15 | 4.20 |

Note:
*means that Si does not satisfy a relation of 1.5 (mass % Mn) − 2 ≦ (mass % Si) ≦ 2 (mass % Mn)

As the above production conditions, the finisher delivery temperature of hot rolling (FDT), cold rolling draft, annealing temperature, quench stopping temperature, Al content in the plating bath, Fe content in plated layer after the alloying and the like are measured to obtain results as shown in Table 3.

TABLE 3

| Steel No. | Plating conditions | | | | | | Plating properties | | | | | |
|---|---|---|---|---|---|---|---|---|---|---|---|---|
| | FDT (°C.) | Draft of cold rolling (%) | annealing temperature (°C.) | quench stopping temperature (°C.) | Al content in bath (mass %) | Fe content in plated layer (%) | TS (MPa) | El (%) | TS × El (MPa.%) | non-plated portion | Resistance to powdering | Remarks |
| 1 | 850 | 82 | 830 | 420 | 0.130 | 10.5 | 388 | 42.5 | 16503 | ⊙ | ⊙ | Acceptable Example |
| 2 | 840 | 85 | 850 | 400 | 0.141 | 10.2 | 415 | 40.2 | 16699 | ⊙ | ⊙ | Acceptable Example |
| 3 | 850 | 83 | 820 | 460 | 0.135 | 10.8 | 417 | 39.6 | 16523 | ⊙ | ⊙ | Acceptable Example |
| 4 | 860 | 80 | 820 | *350 | 0.135 | 10.8 | 416 | 39.6 | 16492 | x | ⊙ | Comparative Example |
| 5 | 850 | 82 | 820 | *560 | 0.135 | 10.8 | 418 | 39.6 | 16539 | ⊙ (unevenness) | ⊙ | Comparative Example |
| 6 | 870 | 78 | 820 | 460 | *0.112 | 12.8 | 417 | 39.6 | 16508 | ⊙ | x | Comparative Example |
| 7 | 880 | 80 | 820 | 460 | *0.148 | 9.2 | 417 | 39.6 | 16513 | x | ⊙ | Comparative Example |
| 8 | 860 | 79 | 870 | 480 | 0.124 | 9.8 | 431 | 37.4 | 16105 | ⊙ | ⊙ | Acceptable Example |
| 9 | 880 | 78 | 840 | 500 | 0.128 | 11.2 | 441 | 35.2 | 15538 | ⊙ | ⊙ | Acceptable Example |
| 10 | 870 | 74 | 820 | 430 | 0.127 | 10.5 | 470 | 35.1 | 16501 | ⊙ | ⊙ | Acceptable Example |
| 11 | 830 | 81 | 800 | 450 | 0.132 | 10.6 | 410 | 40.1 | 16457 | ⊙ | ⊙ | Acceptable Example |
| 12 | 860 | 76 | 820 | 470 | 0.143 | 10.3 | 468 | 35.6 | 16650 | ⊙ | ⊙ | Acceptable Example |
| 13 | 880 | 75 | 830 | 510 | 0.134 | 10.0 | 486 | 28.5 | 13838 | ⊙ | ⊙ | Acceptable Example |
| 14 | 890 | 81 | 850 | 440 | 0.124 | 11.2 | 397 | 36.2 | 14383 | x | x | Comparative Example |
| 15 | 900 | 78 | 820 | 460 | 0.133 | 11.1 | 428 | 34.3 | 14675 | x | x | Comparative |

TABLE 3-continued

| | | | Plating conditions | | | | | | | Plating properties | | |
|---|---|---|---|---|---|---|---|---|---|---|---|---|
| | | Draft | | quench | | Fe content | | | | | | |
| Steel No. | FDT (°C.) | of cold rolling (%) | annealing temperature (°C.) | stopping temperature (°C.) | Al content in bath (mass %) | in plated layer (%) | TS (MPa) | El (%) | TS × El (MPa.%) | non-plated portion | Resistance to powdering | Remarks |
| 16 | 900 | 73 | 840 | 460 | 0.138 | 10.5 | 492 | 27.2 | 13395 | x | x | Comparative Example |
| 17 | 850 | 77 | 860 | 480 | 0.131 | 10.8 | 442 | 36.7 | 16223 | ○ | x | Comparative Example |
| 18 | 800 | 73 | 820 | 480 | 0.137 | 10.4 | 486 | 33.3 | 16183 | x | x | Comparative Example |

Note:
*is outside the range defined in the invention
◉: not occurred
o: slightly occurred
x: occurred
◎: acceptable
x: unacceptable Moreover, the tensile properties are measured by using a test piece of JIS No. 5, and the plating properties are evaluated by the same method as in the aforementioned experiment.

As seen from Tables 2 and 3, all of acceptable examples according to the invention are excellent in TS–El balance shown by TS×El and have excellent plating properties.

INDUSTRIAL APPLICABILITY

The invention provides high-strength hot dip galvannealed steel sheets having excellent plating properties and good properties suitable for press forming by utilizing Si as a strengthening component in extreme-low carbon steels and specifying an interrelation between Si and Mn contents. The steel sheets according to the invention largely contribute to reduce the weight of automobile and improve the safety.

We claim:

1. A high-strength hot dip galvannealed steel sheet having excellent plating properties and good press formability for end structural uses such as vehicle bodies, said sheet comprising a steel sheet having a composition consisting essentially by weight of the following elements:

C: from 0.0005% to 0.0050%
Si: from 0.1% to 2.5%
Mn: from 0.1% to 2.5%
Ti: from 0.003% to 0.10%
Nb: from 0.003% to 0.10%
B: from 0.0005% to 0.0080%
P: from 0.040% to 0.18%
S: not more than 0.008%
Al: from 0.005% to 0.10%
N: not more than 0.0060% provided that the contents of Si and Mn satisfy the following equation (1), the remainder being Fe and incidental impurities, and said sheet having adhered thereto a hot dip galvannealed layer formed on a surface of said sheet, said layer containing $SiMnO_3$ and having an Fe content of 9–12% by weight, wherein said equation (1) is, where percentages are by weight:

$$1.5(\% Mn) - 2 \leq (\% Si) \leq 2(\% Mn) \quad (1);$$

and wherein said steel is produced by the steps comprising:

hot rolling said steel and subjecting it to finish rolling within a temperature range of about 750° C. to 1000° C., pickling and subjecting said steel to cold rolling at a draft of 60% to 95%, and passing the resulting cold rolled sheet through a continuous hot dip galvannealing step wherein said steel is recrystallized within a temperature range of 700° C. to 950° C., quenching said steel to a temperature region of 380°–530° C., immersing said steel in a hot dip galvannealing bath of 450°–490° C., said bath containing 0.12–0.145% of Al at a temperature that is not lower than the bath temperature but not higher than the bath temperature +10° C., and alloying said steel by heating within a temperature range of 450°–550° C. for not less than 14 seconds but not more than 28 seconds.

2. A high-strength hot dip galvannealed steel sheet having excellent plating properties and good press formability according to claim 1, wherein the C content of said sheet is from 0.0005% to 0.004%.

3. A high-strength hot dip galvannealed steel sheet having excellent plating properties and good press formability according to claim 1, wherein the Si content of said sheet is from 0.2% to 2.5%.

4. A high-strength hot dip galvannealed steel sheet having excellent plating properties and good press formability according to claim 1, wherein the Mn content of said sheet is from 0.2% to 2.5%.

5. A high-strength hot dip galvannealed steel sheet having excellent plating properties and good press formability according to claim 1, wherein the B content of said sheet is from 0.0005% to 0.0050%.

6. A high-strength hot dip galvannealed steel sheet having excellent plating properties and good press formability according to claim 1, wherein the P content of said sheet is from 0.04% to 0.15%.

7. A high-strength hot dip galvannealed steel sheet having excellent plating properties and good press formability according to claim 1, wherein the Al content of said sheet is from 0.005% to 0.06%.

8. A high-strength hot dip galvannealed steel sheet having excellent plating properties and good press formability according to claim 1, wherein the N content of said sheet is not more than 0.0040%.

9. A method of producing a high-strength hot dip galvannealed steel sheet having excellent plating properties and good press formability, said sheet comprising a steel sheet having a composition consisting essentially by weight of the following elements:

C: from 0.0005% to 0.0050%,
Si: from 0.1% to 2.5%,
Mn: from 0.1% to 2.5%,
Ti: from 0.003% to 0.10%,
Nb: from 0.003% to 0.10%,
B: from 0.0005% to 0.0080%,
P: from 0.040% to 0.18%,
S: not more than 0.008%,
Al: from 0.005% to 0.10%,
N: not more than 0.0060%, provided that Si and Mn satisfy the following equation (1), the remainder being Fe and incidental impurities, the steps which comprise:
hot rolling said steel and subjecting it to finish rolling within a temperature range of about 750° C. to 1000° C.,
pickling and subjecting said steel to cold rolling at a draft of 60% to 95%, and
passing the resulting cold rolled sheet through a continuous hot dip galvannealing step wherein said steel is recrystallized within a temperature range of 700° C. to 950° C.,
quenching said steel to a temperature region of 380°–530° C.,
immersing said steel in a hot dip galvannealing bath of 450°–490° C., said bath containing 0.12–0.145% of Al at a temperature that is not lower than the bath temperature but not higher than the bath temperature +10° C.,
and alloying said steel by heating within a temperature range of 450°–550° C. for not less than 14 seconds but not more than 28 seconds, wherein said equation is:

$$1.5(\% \text{ Mn})-2 \leq (\% \text{ Si}) \leq 2(\% \text{ Mn}) \tag{1}$$

* * * * *

UNITED STATES PATENT AND TRADEMARK OFFICE
CERTIFICATE OF CORRECTION

PATENT NO. : 5,882,803
DATED : March 16, 1999
INVENTOR(S) : Seto et al.

It is certified that error appears in the above-identified patent and that said Letters Patent is hereby corrected as shown below:

In Column 1, at line 36, please change "aging" to --aging,--;

at line 49, please delete "a" after "as"; and
at line 51, please change "and" to --and,--.

In Column 2, at line 29, please delete "wherein".

In Column 4, at line 18, please change "the" to --a-- after "provide";
at lines 20-23, 26, 34, 35, 40-47, 51, 56, 58-62, 65, 66, and 69, please delete "mass";
at line 25, please delete "the";
at line 37, please delete "the";
at line 48, please delete "full" to --all--, at both occurrences;
at line 50, please delete "the";
at line 51, please change "the" to --that--;
at line 53, please change "it exceeds 0.1 mass%, the" to --the content exceeds 0.1%,--;
at line 63, please delete "the"; and
at line 66, please delete "the".

In Column 5, at line 1, 3, 4-8, 13, 19, 20, 21-26, 33, 35, 36, 39, 43-46, 48, 51, 53, 54, and 56, please delete "mass";
at line 3, please change "that" to --when--;
at line 9, please delete "an";
at line 10, please delete "the" and before "average" insert --the--;
at line 15, please delete "the";

UNITED STATES PATENT AND TRADEMARK OFFICE
CERTIFICATE OF CORRECTION

PATENT NO. : 5,882,803
DATED : March 16, 1999
INVENTOR(S) : Seto et al.

Page 2 of 5

It is certified that error appears in the above-identified patent and that said Letters Patent is hereby corrected as shown below:

at line 17, please delete "the", second and third occurrences;
at line 19, please delete "required";
at line 20, please delete "the";
at line 27, please change "0.015" to --0.008-- and delete "a great";
at lines 28, 29, and 30, please delete in their entirety;
at line 31, please change "mass% from a viewpoint" to --%, there is a problem from the viewpoint--;
at line 32, please delete "made";
at line 33, please change "cost" to --cost rises--;
at line 34, please delete "rises" and change "si" to --is--;
at line 39, please change "increases and a" to --increase and";
at line 41, please delete "the" at both occurrences;
at line 47, please delete "the";
at line 50, please change "required" to --necessary--;
at line 52, please delete "the";
at line 55, please change "desirable" to --desirably-- and delete "to become";
at line 58, please change "reason" to --reasons for--;

at line 67, please insert --a-- after "of" and delete "the" before "press"; and
at line 69, please insert --at-- before "above".

In Column 6, at line 1, please change "the" to --a--, first occurrence and delete "the", second occurrence;
at line 5, please delete "the", first occurrence;
at line 6, please delete "the";

UNITED STATES PATENT AND TRADEMARK OFFICE
CERTIFICATE OF CORRECTION

PATENT NO. : 5,882,803
DATED : March 16, 1999
INVENTOR(S) : Seto et al.

It is certified that error appears in the above-identified patent and that said Letters Patent is hereby corrected as shown below:

at line 7, please delete "the";
at line 9, please delete "the", second occurrence;
at line 11, please delete "The plating" to --Plating--;
at line 13, please change "the cold rolling is sufficient to be" to --cold rolling is--;
at line 16, please delete "the";
at line 17, after "temperature, please insert --in the--;
at line 18, before "non-plated" please insert --a--;
at line 20, please delete "be" and "the" second occurrence;
at line 21, please delete "the";
at line 22, please delete "mass";
at line 23, please delete "mass" and "the" third occurrence;
at line 24, please change "too promoted" to --promoted too much--;
at line 26, please delete "mass" and change "the" to --a--;
at line 27, please change "The alloying" to --Alloying-- and change "followed" to --applied--;
at line 29, please insert --the range of-- after "into" and delete "the";
at line 33, please delete "the";
at line 34, please change "9%" to --9%,--;
at line 37, please delete "the";
at line 38, please delete "the";
at line 42, please insert --the sum-- after "than";
at line 44, please delete "the" third occurrence;
at line 48, please change "the elusion" to --elution--;
at line 49, please change "form dross" to --form a dross,--
at line 50, please change "the surface defect is" to --surface defects are--;

UNITED STATES PATENT AND TRADEMARK OFFICE
CERTIFICATE OF CORRECTION

PATENT NO. : 5,882,803
DATED : March 16, 1999
INVENTOR(S) : Seto et al.

It is certified that error appears in the above-identified patent and that said Letters Patent is hereby corrected as shown below:

at line 52, please delete "a";
    at line 55, please insert --of the sheet-- after "resistance";
    at line 58, please change "the" to --a--;
    at line 59, please change "the" to --a--, first occurrence;
    at line 64, please change "component: to --composition--; and
    at line 67, please delete "a" before "plating".

In Column 7, at line 2, please insert --the-- before "sheet";
    at line 4, please change "condition is a" to -- is done by--;
    at "Table 2", please change the heading "Chemical components (mass %)" to --Chemical components (%)--;
    please change the subheading "1.5 (mass% Mn)-2" to --1.5 (% Mn)-2--;
    please change the subheading "2 (mass% Mn)" to --2 (% Mn)--; and
    at the bottom of the Table, at the "Note:" please change "*means that Si does not satisfy a relation of 1.5 (mass% Mn)-2 $\leq$ (mass % Si $\leq$ 2 (mass % Mn)" to --*means that Si does not satisfy the relation  1.5 (% Mn)-2 $\leq$ (% Si $\leq$ 2 (% Mn)--.

In Column 8, at approximately line 32, please change "are" to --were--.

At "Table 3", please change the subheading "Al content in bath (mass %)" to --Al content in bath (%)--.

In Column 9 at "Table 3-continued", please change the subheading "Al content in bath (mass %)" to --Al content in bath (%)--;
    at approximately line 23, please change "are" to --were--;

UNITED STATES PATENT AND TRADEMARK OFFICE
CERTIFICATE OF CORRECTION

PATENT NO. : 5,882,803
DATED : March 16, 1999
INVENTOR(S) : Seto et al.

It is certified that error appears in the above-identified patent and that said Letters Patent is hereby corrected as shown below:

at line 24, please change "of" to --according to--;
    at line 27, please insert --the-- after "of";
    at line 28, please change "are" to --were--;
    at line 29, please change "TSxE1 and have" to --TSxE1, and all had--;
    at line 35, please change "an" to --the--; and
    at line 37, please change "automobile and improve the" to --automobiles and improve their--.

Signed and Sealed this

Fifth Day of September, 2000

Attest:

Attesting Officer

Q. TODD DICKINSON

Director of Patents and Trademarks